No. 614,490. Patented Nov. 22, 1898.
P. McENANY.
BUTTON.
(Application filed Sept. 25, 1897.)
(No Model.)
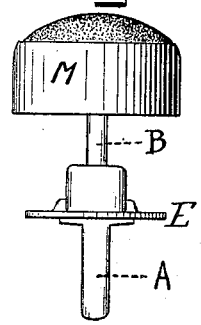
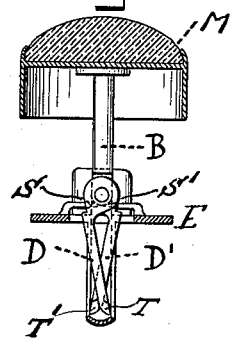
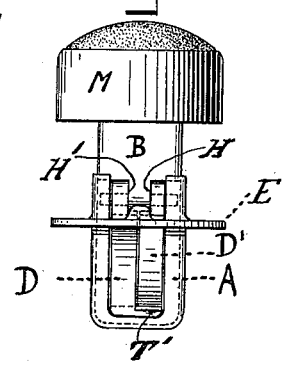
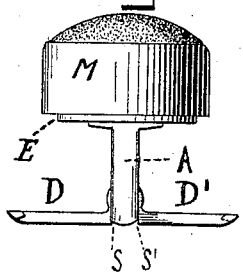
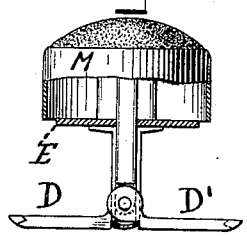
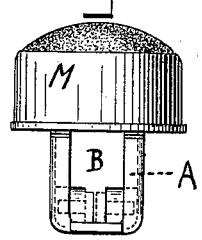
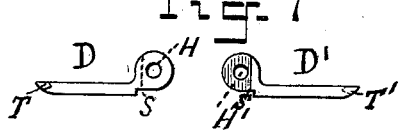
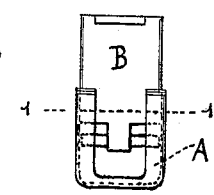
WITNESSES:
Charles Hanimann
G. Hanbury
Patrick McEnany, INVENTOR
BY
ATTORNEY

UNITED STATES PATENT OFFICE.

PATRICK McENANY, OF NEW YORK, N. Y.

BUTTON.

SPECIFICATION forming part of Letters Patent No. 614,490, dated November 22, 1898.

Application filed September 25, 1897. Serial No. 652,984. (No model.)

*To all whom it may concern:*

Be it known that I, PATRICK MCENANY, a citizen of the United States, and a resident of New York, (Brooklyn,) in the county of Kings and State of New York, have invented certain new and useful Improvements in Buttons, of which the following is a specification, reference being had to the accompanying drawings, forming a part thereof.

My invention relates to buttons, and has particular reference to a stud to be worn in shirt-bosoms. It belongs to that general class of buttons with arms which are caused to spread or close through the movement of a sliding stem to which they are pivoted.

The object of my improvement is to provide a cuff or collar button which is more readily entered into a buttonhole.

The invention consists in the various features forming the annexed claims and is fully illustrated in the accompanying drawings, which are part of this specification.

Figure 1 is a front view of my stud in the downward position of the arms. Fig. 2 is a cross-section thereof. Fig. 3 is a side view of my stud also in the downward position of the arms. Fig. 4 is the front view of the button in the spread position of the arms. Fig. 5 is a cross-section thereof. Fig. 6 is the side view in the spread position of the arms. Fig. 7 shows a side view of the pivoted arms separated from each other. Fig. 8 is a front view of the sliding stem. Fig. 9 is a side view of the sliding stem and the grooved bridge in which said stem moves. Fig. 10 is a top view of the disconnected arms. Fig. 11 is a sectional view of the grooved bridge. Fig. 12 is a cross-section of the bridge.

The drawings show the stud much enlarged for clearer illustration.

It is not new to actuate arms by a sliding movement of a stem to which they are attached. The novelty of my invention is mainly found in the detailed construction of the arms and in a certain combination of parts; but in order that my device be clearly understood I will briefly refer to the various portions of the button.

The parts marked by the letter M in the drawings represent the head or setting of the stud. A stem B, secured thereto, carries the arms D and D' and slides in the grooved bridge A, which is provided at its upper end with a base-plate E, fitting closely to the base of the head M when the stud is adjusted, Figs. 4, 5, and 6.

The arms D and D' are so constructed that they lock each other in the spread position, and for this purpose the recesses or incisions S and S' and H and H' are made. Two tongue extensions T and T' are provided to prevent the spreading of both arms to one side.

The operation of the device will be readily understood. To insert the stud, the head M is first drawn up with the result of bringing about the position shown in Figs. 1, 2, and 3, which enables the easy insertion of the stud into the buttonhole. Next the head is pressed down, the arms spread, Figs. 4, 5, and 6, and locked through the recesses or incisions S S' and H and H' against any pressure of the garment.

Having now fully described my invention, I claim—

1. A button composed of a head M, to which is secured a stem B, which carries the pivoted arms D and D', and slides in a grooved bridge A, provided at its upper end with a base-plate E, fitting closely to the base of the said head, when the stud is adjusted, said arms D and D', provided with the cuts S and S', H and H', for the purpose of holding the arms locked against each other, when the button is adjusted, substantially as shown and described.

2. A stud having a bridge A, a sliding stem B, operating in said bridge, said sliding plate carrying the pivoted arms D and D', said arms having the cuts S and S', and H and H', substantially as shown and described.

3. In a button the grooved bridge A, a stem B fitting, and sliding in said bridge, two arms D and D', pivoted to said stem, said arms provided with the tongues T and T', and with the cut-out portions H and H', and S and S', substantially as shown and described.

4. In a button or stud the combination with the head, a sliding stem B, a bridge A, and two arms, provided with cuts S, S', H, and H', and pivoted to said sliding stem, said arms having also the extensions T and T', to prevent the spreading of both arms to one side, substantially as shown and described.

Signed at New York, in the county of New York and State of New York, this 19th day of August, A. D. 1897.

PATRICK McENANY.

Witnesses:
G. HANBURY,
ARTHUR C. MILLS.